(No Model.)

G. R. DYKES & J. M. WOODS.
COTTON CULTIVATOR.

No. 353,212. Patented Nov. 23, 1886.

Witnesses
P. N. Hale.
W. R. Haight.

Inventor
George R. Dykes
and
John M. Woods
By their Attorney
Wm H Babcock

UNITED STATES PATENT OFFICE.

GEORGE R. DYKES AND JOHN M. WOODS, OF PULASKI COUNTY, GEORGIA.

COTTON-CULTIVATOR.

SPECIFICATION forming part of Letters Patent No. 353,212, dated November 23, 1886.

Application filed August 26, 1886. Serial No. 211,959. (No model.)

*To all whom it may concern:*

Be it known that we, GEORGE R. DYKES and JOHN M. WOODS, citizens of the United States, residing in the county of Pulaski and State of Georgia, have invented certain new and useful Improvements in Cotton-Cultivators; and we do hereby declare the following to be a full, clear, and exact description of the invention, such as will enable others skilled in the art to which it appertains to make and use the same.

The chief object of this invention is to provide a cotton-cultivator with means for preserving all the plants in a row or stand, or only those at certain intervals therein, as preferred, while the other cotton-plants are destroyed along with the weeds by plowing earth upon them.

To this end our invention consists, principally, in a guard-wheel having protective cups arranged at certain points on its periphery to preserve the cotton-plants at certain intervals, in combination with plates detachably fastened at the sides of said wheel, which have the effect of protecting all the plants in the row while they are in place. Their removal allows only the plants at certain intervals in that row to be protected, those intervals corresponding to the spaces between the cups around the periphery of said wheel.

The invention consists, finally, in certain improvements in the frame, plow-standards, adjusting devices, and other parts, all as hereinafter fully described, and pointed out in the claims.

Figure 1:
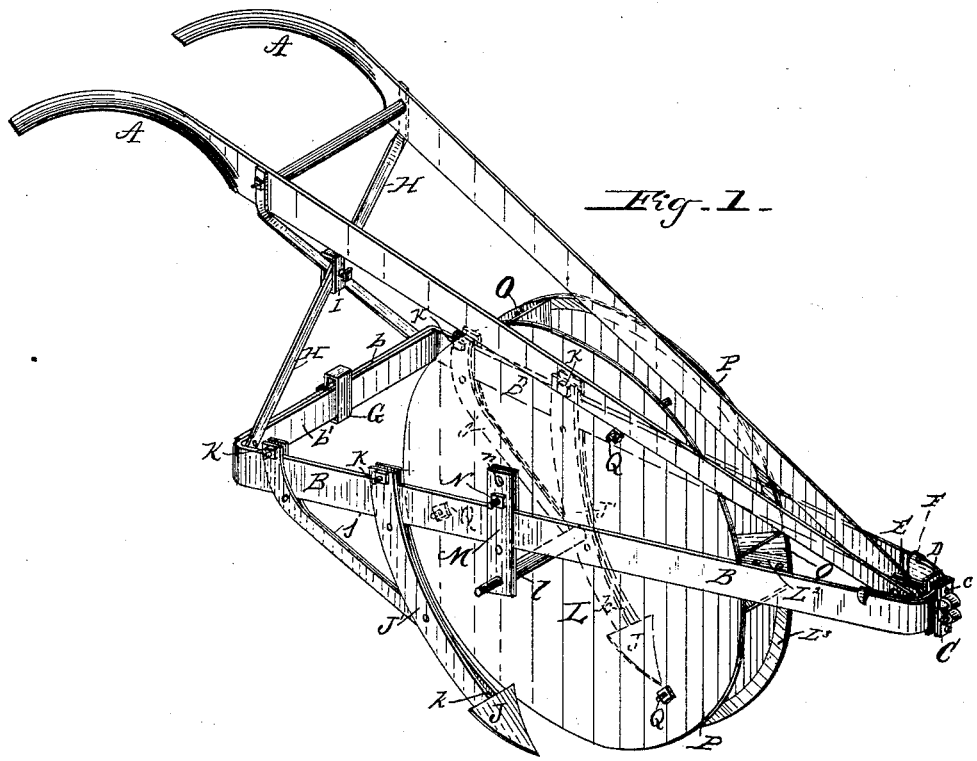
Figure 2:
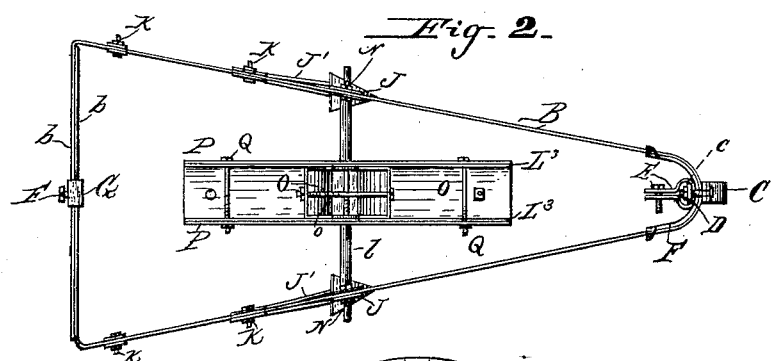
Figure 3:
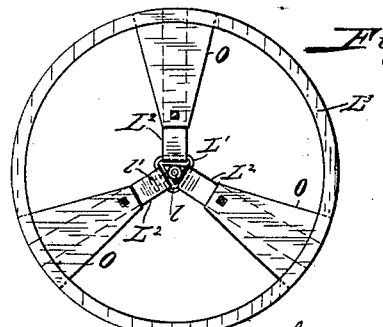

In the accompanying drawings, Figure 1 represents a perspective view of a cotton-cultivator embodying our invention, the side plates being attached to the guard-wheel. Fig. 2 represents a plan view of the frame, plow-standards, wheel, and other attachments of the frame, including the converging forward ends of the handles broken away. Fig. 3 represents in detail a side elevation of the wheel without the side plates shown in Figs. 1 and 2.

A designates the handles, which are of ordinary construction; B, the triangular frame of the cultivator, and C the draft-clevis. This last is utilized for fastening the handles and frame together by making its bolts *c* pass through a plate, D, which extends vertically through a metallic eye or loop, E, attached to the converging forward ends of said handles. A metallic re-enforce, F, conforms to the shape of the front end of the frame B and is attached to the inner face thereof. The rear of said frame is divided, the overlapping ends *b b'* of the flat metallic bar, from which said frame is formed, being secured together by a clamping-screw, F, which bears against the outer one, *b*, of said overlapping ends, and a small frame, G, which surrounds said parts *b b'*, so as to be drawn against the latter simultaneously. The screw F works through the outer wall of said small frame. By loosening the screw, moving the ends *b b'* backward or forward over each other, and tightening the screw again the width of the frame and the distance between the plow-points may be adjusted at will.

Instead of the very common clamping device above described, any equivalent one may be substituted.

From the rear corners of the frame B brace-bars H extend obliquely upward to the handles A, crossing one another at the middle, where they are fastened together by a clamp, I. These bars are preferably riveted to the frame, but bolted or otherwise detachably secured to the handles.

The plows J are shown as two in number, suspended from each side of the frame, near the rear end thereof; but they may of course be more numerous. The standard J' and inclined rear brace, *j*, of each are bifurcated at the top, to clasp the side bar of said frame, these bifurcated ends being fastened above said frame by clamping-bolts K. To the feet *k* any form of plow-point may be attached. Those which we show marked J, as stated, are arranged to throw the earth both ways, one of the feet being shown in Fig. 1 in dotted lines. By loosening the bolts K, moving the standard forward or backward and tightening the said bolts again, the position of any one or more of the plows may be adjusted obliquely forward and inward or backward and outward.

L designates a guard-wheel, which turns with a shaft, *l*, arranged transversely of the cultivator and journaled in the lower ends of bearing-bars M, attached to the sides of said frame. The upper parts of these bearing-bars are bifurcated to clasp the side bars of the frame B, and provided with two or more holes through both leaves or forks of the bifurcation. The lower hole is shown as occupied by a fastening-bolt, N; but this last may be transferred to the upper hole, n. As the bearing-bars on each side are of the same construction and arrangement, these bolts and holes provide for vertical adjustment of the wheel L, which may often be important to compensate for variations in the depth of the plows or differences in the construction thereof. The same bolts, being the sole means of attachment of the wheel, allow it to be easily adjusted forward or backward in frame B, said bolts being alternately loosened and tightened for that purpose.

The wheel itself, the most important part of our invention, consists of a hub, L', detachably fastened by a screw, l', to the shaft l aforesaid, plates L², extending radially from opposite sides of said hub in pairs, and parallel rings L³, which are attached to the outer ends of said plates and mark the side edges of the periphery of the wheel.

O designates flaring cups, which, like the rest of the wheel, are preferably made of metal. These are arranged at regular intervals radially in the wheel, each cup fitting on a pair of plates, L², and having its outer edges flush with those of the rings L³ to which it is riveted. A strengthening-bolt, o, crosses each cup from side to side at right angles to the plane passing through the two plates L². When the cup is made of two corresponding and overlapping sections, as shown and preferred, the bolt, passing through their overlapping parts, holds said sections together.

P designates two circular plates or disks of diameter equal to the wheel L, and when in use fastened against the sides thereof by bolts Q, which pass through from one disk or plate P to the other, making them practically parts of the wheel. They effectually close its sides, and, reaching to the ground, protect all the plants in the row, as these successively come between them, from the earth thrown inward by the plows. When these plates are removed, the wheel is left open at the sides, except where the cups O are arranged therein. Under this latter arrangement the earth from the plows covers all the plants in the row or stand within the wheel, except where at certain intervals the cups O are successively turned down, each around a plant, in the course of rotation of the wheel.

The shaft l is easily removed from the bearing-bars M when the frame B is sufficiently spread apart, as already described, although its journals are of sufficient length to allow a considerable widening of said frame without that effect. After removing the entire wheel from the frame the plates P are easily unbolted and detached from the wheel.

It is sometimes convenient to convert this machine into an ordinary cultivator. For this purpose we remove the wheel and substitute a longitudinal bar carrying one or more additional plows. The frame and attachments are easily adaptable to use in cultivating, harrowing, and other farming purposes; but in its normal use with the wheel our cotton-cultivator is in effect a selector and destroyer combined, leaving all the plants in a row or stand untouched if the plates P are used, or saving solely, but with perfect accuracy, those which grow at certain predetermined intervals in case the cups are used without the side plates. These intervals may be increased or decreased by varying the number of protective cups O. Selection by means of these cups will naturally be adopted when the field is profusely supplied with plants. When it is scantily supplied, the plates P will come in play; and the same tests apply to its use with individual stands in the same field, some showing many plants, others but few. The planter is thus enabled to equalize the growth and have good stands everywhere.

The cultivator and plant destroyer is easily run, does its work quickly and effectively, and requires but one hand for its management. It would be possible to use but one plow and one side plate; but the double construction shown is obviously far more perfect.

Having thus described our invention, what we claim as new, and desire to secure by Letters Patent, is—

1. In combination with a frame and plows arranged along both sides thereof, a wheel arranged between them and provided with cups O at certain intervals, and the circular plates P of equal diameter with said wheels, said plates being detachably fastened to the latter, substantially as set forth.

2. In combination with the frame, the wheel L, shaft l, bearing-bars M, and the bolts passing through the bifurcated upper ends of the latter, said bifurcated ends being provided with holes arranged one above the other in order that the wheel may be adjustable vertically as well as backward or forward, substantially as set forth.

3. In combination with the handles and the eye or loop attached thereto, the plate passed through said eye or loop, the clevis and its bolts and the frame B, and re-enforce interposed between said clevis and said handles and held by said bolts, substantially as set forth.

In testimony whereof we affix our signatures in presence of two witnesses.

GEORGE R. DYKES.
JOHN M. WOODS.

Witnesses:
CHAS. M. WHITEHURST,
F. H. BOZEMAN.